Oct. 1, 1968    J. F. MORSE    3,403,578
ADJUSTING DRUM FOR REMOTE TRANSFER SYSTEM
Filed Sept. 29, 1967    5 Sheets-Sheet 1
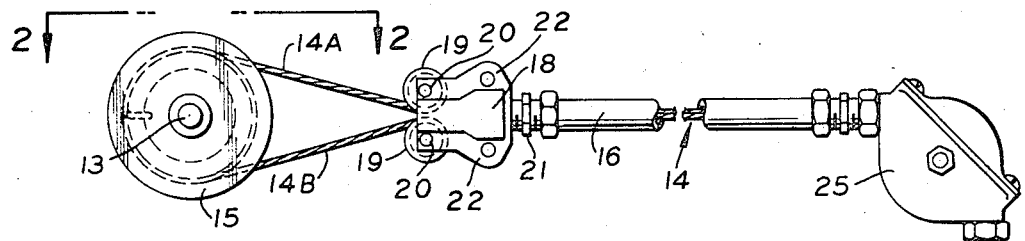
FIG. 1
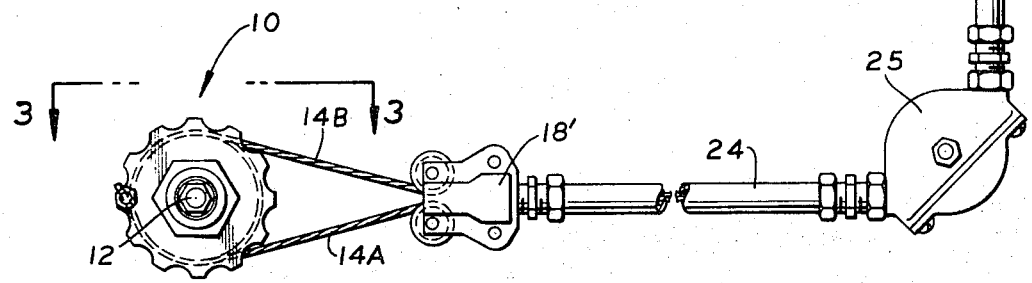
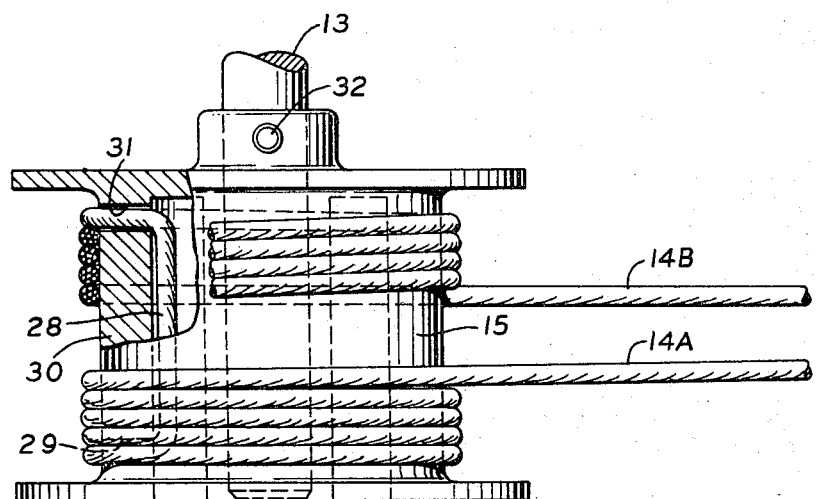
FIG. 2
INVENTOR.
JOHN F. MORSE
BY Hamilton & Cook
ATTORNEYS

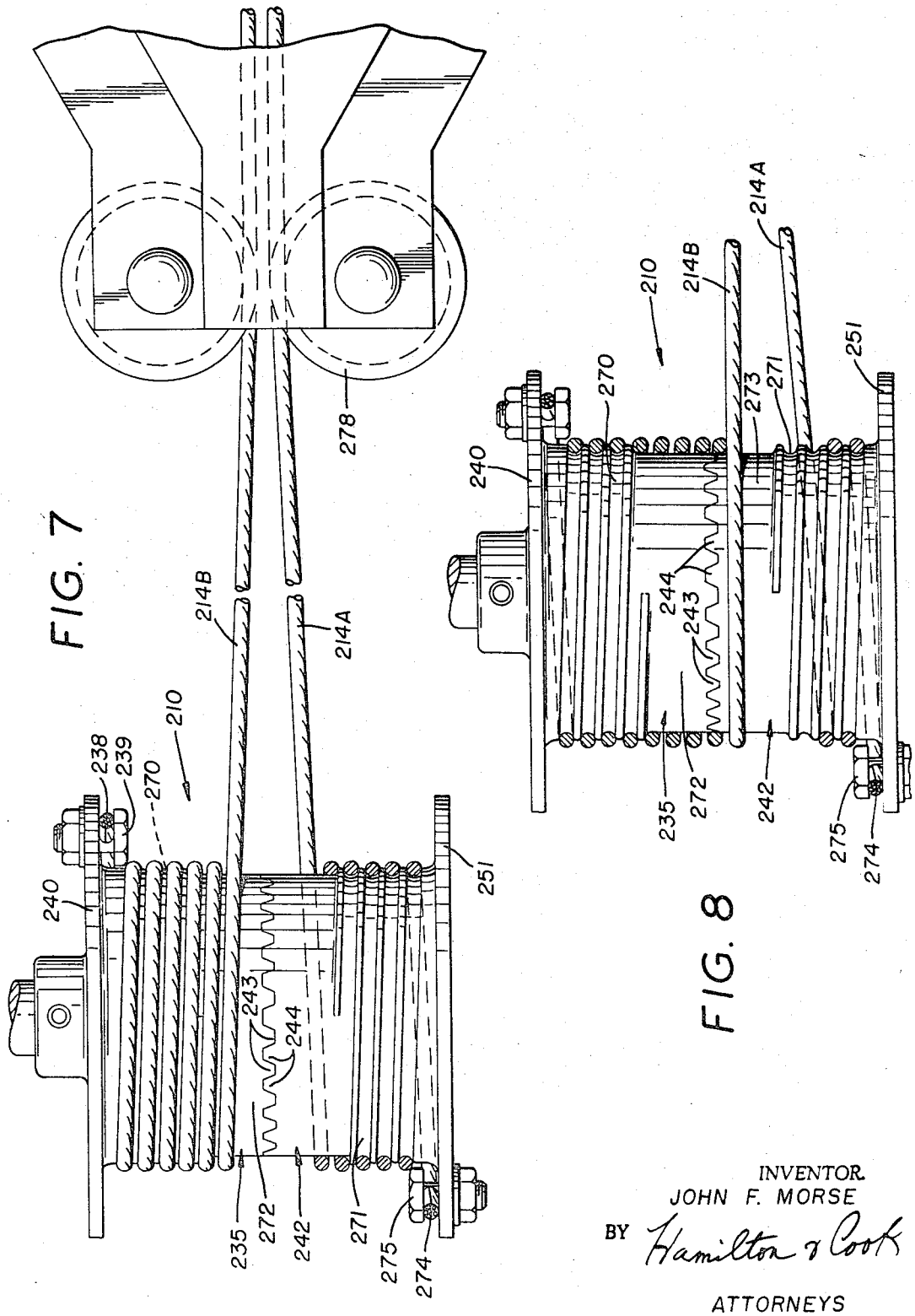

Oct. 1, 1968 J. F. MORSE 3,403,578
ADJUSTING DRUM FOR REMOTE TRANSFER SYSTEM
Filed Sept. 29, 1967 5 Sheets-Sheet 5

INVENTOR
JOHN F. MORSE
BY Hamilton & Cook
ATTORNEYS

United States Patent Office 3,403,578
Patented Oct. 1, 1968

3,403,578
ADJUSTING DRUM FOR REMOTE
TRANSFER SYSTEM
John F. Morse, 21 Clinton St.,
Hudson, Ohio  44236
Continuation-in-part of application Ser. No. 499,236,
Oct. 21, 1965. This application Sept. 29, 1967, Ser.
No. 677,825
12 Claims. (Cl. 74—501)

ABSTRACT OF THE DISCLOSURE

A drum for adjusting the tension in balanced cables used to transfer motion between a driving and a driven shaft. The drum, mounted for rotation on one of said shafts, is split transversely its rotational axis into a capstan and a floating section. One of the balanced cables is secured to each of the capstan and floating sections, both of which are preferably provided with a cable receiving, helical groove over approximately that half of the outer surface which is most remote from the split defining the two sections. A plurality of teeth on the floating section selectively intermesh with opposed teeth on the capstan section so that when this first plurality of teeth are intermeshed relative rotation between the sections is precluded. The capstan section is secured to the shaft on which the drum is mounted for rotation. Exemplary of such connection is a radially extending anchor plate affixed to the shaft. A plurality of teeth on the anchor plate selectively intermesh with opposed teeth on the capstan section. Relative rotation between the capstan section and the anchor plate is precluded when this second plurality of teeth are intermeshed. Clamping means are provided to permit selective engagement and disengagement of the first and second plurality of teeth to adjust the tension in the cable strand attached to the floating section with respect to the cable strand attached to the capstan section, as well as the tension of the cable strand attached to the capstan section with respect to the rotational position of the shaft with which said drum rotates.

Cross reference to related applications

The subject application is a continuation-in-part of my copending United States application, Ser. No. 499,236, filed Oct. 21, 1965, now abandoned.

Background of the invention

Motion transfer mechanisms are basically of two types. There is the push-pull cable and the "balanced" system. The push-pull cable generally comprises a flexible core slidably received in an outer casing for transmitting mechanical motion in either direction when the outer casing is clamped in position. Thus, remote control can be effected by the application of either tensile or compressive forces to the core. An example of the push-pull control cable can be found in my prior United States patent, No. 3,013,443.

The second type of motion transfer system is as old as the concept of remote steering. For example, when applied to a ship's steering mechanism a "balanced" system has traditionally comprised a wheel and shaft with a rope driving drum at the steering station to provide the required movement of the two ropes leading from the driving drum to the driven component and connected thereto in opposition. The opposition of the connection to the driven component and the appelation "balanced" system appear quite appropriate when it is realized that the mechanical motion transmitting ropes, or cables, must form a closed system because of their inability to relay mechanical motion by other than tensile stresses. An improved remote motion transfer mechanism of the balanced type can be found in my prior United States patent, No. 2,737,822, wherein it is noted that while such mechanisms are particularly adapted to marine installations, they are not limited thereto.

The mechanism disclosed in my United States Patent No. 2,737,822 is quite satisfactory for use in situations where the rotation of the driving and driven components does not involve much more than a half of one revolution. It is readily apparent that if greater rotational movement is required, the distance between the terminal block assemblies and the drums becomes excessive. This distance is further increased by the necessity of turnbuckles to adjust the tension of the cables and the amount of overlay required to clamp the cable ends to the turnbuckle or other end fittings.

Summary of the invention

It is therefore a primary object of the present invention to provide a suitable mechanism for adapting a balanced remote transfer system to provide multiple revolutions of the driving and driven components.

It is another object of the present invention to provide a drum means for use with the driving and/or driven component of a balanced system which permits individual tensioning of the control cables commonly received thereon.

It is still another object of the present invention to provide an adjusting drum means, as above, in which any tendency of the cables to overwrap, even after several rotations of the drum means, is minimized.

It is a further object of the present invention to provide a drum means, as above, which is capable of adjusting the cable tension with respect to the drum and, selectively, with respect to the shaft on which the drum is mounted.

It is a still further object of the present invention to provide an adjusting drum means, as above, which is not only easy to operate but also inexpensive to manufacture, install and maintain.

These and other objects of the present invention, as well as the advantages thereof over existing and prior art forms, will be apparent in view of the following detailed description of the attached drawings and are accomplished by means hereinafter described and claimed.

In general, a system for transferring motion between a driving and driven station by balanced cables according to the concept of the present invention employs at least o e drum, or spool, split transversely the axis thereof into a .apstan section and a floating section. One of the balanced cables is attached to and wound in one direction around the capstan section and the second of the balanced cables is attached to and wound in an opposite direction around the floating section. The capstan section engages the drive or driven shaft by an anchor means for rotation therewith, and the floating section is rotatably mounted on the same shaft adjacent the capstan section with a locking means selectively securing the floating section to the capstan section.

For a drum subjected to a plurality of rotations it is also desirable to provide a cable receiving, threadlike, helical groove over a portion of the cable receiving surface of each section. The cable receiving groove in each section is limited to approximately that half of each section which is most remote from the other section.

To permit adjustment of the cable attached to the capstan section with respect to the relative rotational position of the shaft on which it is carried, the anchor means between the capstan section and said shaft also accommodates locational selectivity.

Four embodiments are shown by way of example in the accompanying drawings and are described in detail

Description of the drawings

FIG. 1 is a somewhat schematic view of a balanced remote motion transfer system embodying the concept of the present invention;

FIG. 2 is an enlarged top plan view of one of the drum means used in said transfer system taken substantially on line 2—2 of FIG. 1.

FIG. 7 is a top plan, similar to FIG. 3, of an alternative form of drum means, said drum means depicted at the midpoint of its normal rotational range;

FIG. 8 is a view similar to FIG. 7 depicting the alternative drum means having been rotated through its full normal range in one direction;

Description of the preferred embodiments

Figure 3:
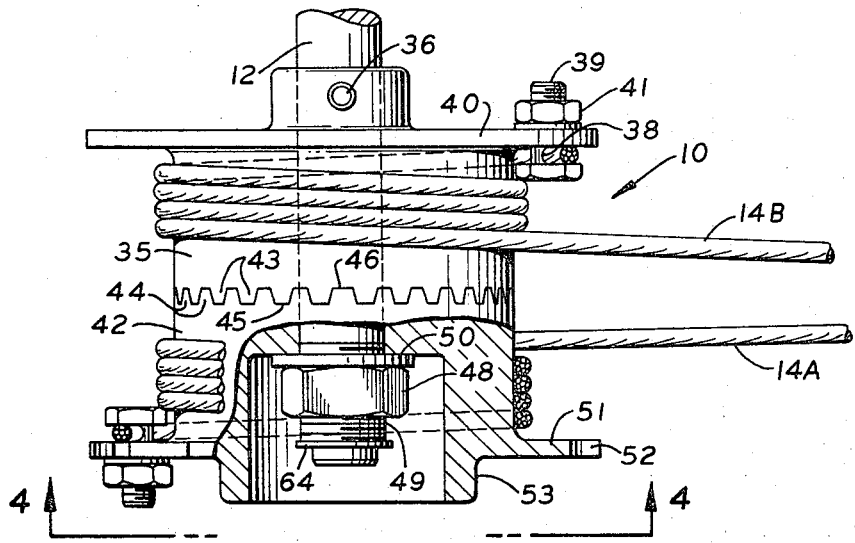
FIG. 3 is an enlarged top plan, partially in section, of the second drum means and the one by which cable tension adjustment is effected, taken substantially on line 3—3 of FIG. 1.

Referring more particularly to the drawings, an improved adjusting drum, indicated generally by the numeral 10, is incorporated in the balanced pulley and cable system 11. Exemplary of a balanced system 11, a control, or driving, shaft 12, which may be located in the pilot house of a ship, is connected thereby to transfer the motion of the driving shaft 12 to a driven shaft 13 in the engine room. The shaft 13 may be operatively connected to the governor or other part of the engine, or to the rudder. The shaft 12 may be rotated by a wheel, hand lever, or other driving device, not shown. While the improved drum 10 is disclosed as being carried on the driving shaft 12, it may just as readily be carried on the driven shaft 13.

The control cable 14 is anchored to, and appropriately wrapped around, a drum 15 nonrotatably secured to the driven shaft in a manner more fully hereinafter described. The pair of strands 14A and 14B formed by cable 14 extend outwardly of the drum 15 and enter a rigid conduit 16 through a terminal block 18. The terminal block 18 has opposed rollers, pulleys, 19 which guide the cable strands 14A and 14B into the entrance of the conduit 16 so that they will pass therethrough without damaging abrasion or other excessive contact.

The pulleys 19 are mounted on shafts 20 supported in one end of the terminal block housing, and the other end is fastened to the conduit 16, as by threading, set screws, or other clamping means 21. Bracket ears 22 may be provided, as desired, for mounting the terminal block 18 in the desired location.

The conduit 16, together with similar sections 23 and 24, traverse between the remote driving and driven stations and are interconnected by elbows 25 fastened to each by clamping means similar to those by which the terminal block 18 is fastened to the conduits. The elbows are preferably made in standard types, such as 45° turns or the 90° turn elbow 25 depicted, and each of the elbows contains the pulleys about which the strands are reeved as they change directions between the successive conduit sections 16, 23 and 24. If desired, a more detailed disclosure of the preferred elbow construction can be found in my prior U.S. Patent No. 2,762,606.

The driven drum 15, as best seen in FIG. 2, is constructed to permit the use of a single cable 14. Several turns of strand 14A are wrapped in one direction around the drum 15, and the strands 14B are wrapped in a counter direction. The bight 28 in the cable 14 between strands 14A and 14B extends through a hole 29, passes beneath a cylindrical shell 30 of the drum 15 and extends through a second hole 31. Such an arrangement also often eliminates the necessity of using cable clamps, the several turns of each strand and the accommodation of the bight being generally sufficient to prevent slippage. In some cases, of course, it may be desired to clamp the cable to the drum, or even to use separate cables for each strand. Such alternatives are well within the ability of one skilled in the art.

The drum 15 is keyed, splined or otherwise nonrotatably secured to the shaft 13, as by the set screw 32, so that rotation of the shaft 13 in one direction will cause the strand 14A to be wrapped onto the drum and permit strand 14B to unwrap; reverse rotation, wraps strand 14B onto the drum and permits strand 14A to unwrap.

Figure 4:
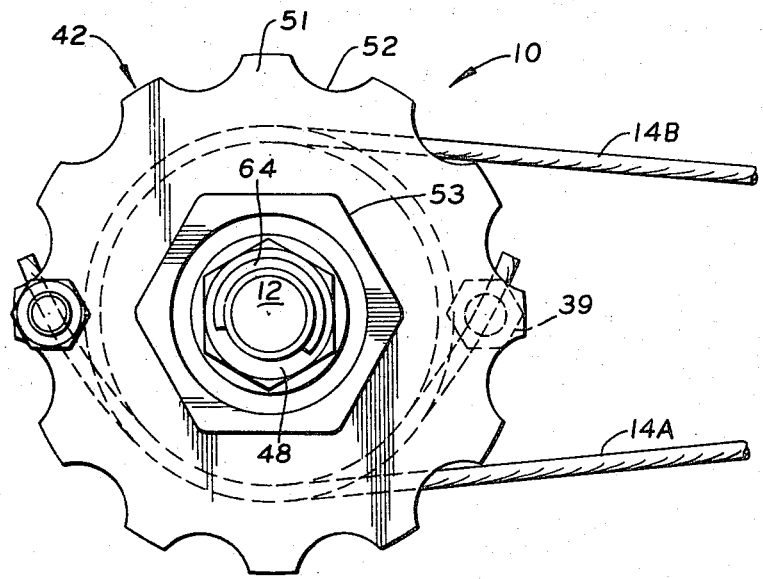
FIG. 4 is a side elevation taken substantially on line 4—4 of FIG. 3.
Figure 5:
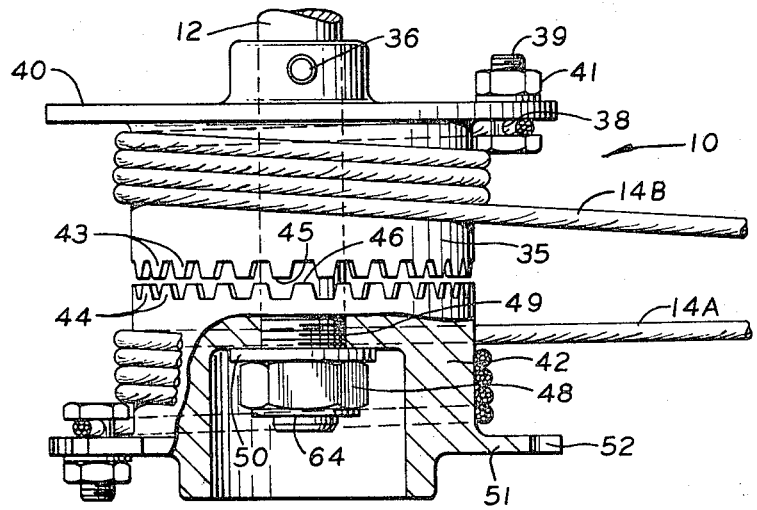
FIG. 5 is a top plan view similar to FIG. 3 depicting the drum means disposed for adjusting the cable tension.

The adjusting drum 10, as represented in FIGS. 3, 4 and 5, receives the opposite ends of strands 14A and 14B.

Drum 10 generally comprises at least two sections. The capstan section 35 is nonrotatably secured to the shaft 12, as by a key, splines, or the set screw 36 depicted. Cable strand 14B extends outwardly of conduit 24 through the terminal block 18' and is wrapped in a given direction around the capstan section 35 a selected number of turns and is anchored thereto, as by inserting the end thereof through the bore 38 extending transversely through the bolt 39 mounted on the radially extending flange 40 of the capstan section. Tightening the nut 41 on bolt 39 clamps the end of the strand 14B firmly against the flange 40.

The direction in which the strand 14B is wrapped around the capstan section 35 will depend upon the desired relative rotation between the driving shaft 12 and the driven shaft 13. If the shafts are intended to turn in the same direction, the strand 14B will be wrapped onto the capstan section 35 in the same direction as it is wound onto the drum 15. However, if the shafts are to revolve oppositely—i.e., clockwise rotation of shaft 12 is to induce counterclockwise rotation of shaft 13—the strand 14B will be wound in an opposite direction onto capstan section 35 from the direction it is wound onto drum 15.

Cable strand 14A is wound onto the second of the two sections forming drum 10. This second, or floating, section 42, is rotatably mounted on the shaft 12 adjacent the capstan section 35, and the strand 14A is always wound in an opposite direction on the floating section 42 from the direction the strand 14B is wound onto the capstan section 35 and may be anchored in a fashion similar to that utilized for anchoring strand 14B. With the strands 14A and 14B thus oppositely wound on both drum 10 and drum 15, rotation therebetween may be effected solely by the application of tensile forces to one or the other of the cable strands, depending upon the direction of rotation.

By wrapping the strands 14A and 14B a number of turns around both the drum 15 and the adjusting drum 10, the rotation of the driving and driven shafts 12 and 13, respectively, is limited only by the number of turns that the strands are wrapped. A much greater range is thereby provided than heretofore practically available with the known balanced remote transfer system. While the floating section 42 of drum 10 is rotatably mounted on shaft 12, a locking means selectively secures the floating section 42 to the capstan section 35. Thus, by selectively unlocking the floating section 42 from the capstan section 35, the two may be relatively rotated to adjust the tension between the strands 14A and 14B, and, when the desired tension is obtained, the two drum sections are resecured together.

The preferred locking means comprises a plurality of teeth 43 extending axially outwardly of the capstan section 35 toward the floating section 42 and meshing interengageably with opposedly directed, axially oriented teeth 44 on the floating section 42. Inasmuch as the intermeshing teeth 43 and 44 serve only to lock the floating section 42 to the capstan section 35 for rotation therewith, the sides of the teeth may be parallel with the axis of drum 10. However, engagement of the teeth is facilitated if the sides of each tooth converge slightly toward the tips 45 and 46, respectively, thereof, as shown.

A clamping, or locking, nut 48 is received on the threaded end portion 49 of shaft 12. Tightening the nut 48 against the floating section 42, as through washer 50, maintains the teeth 43 and 44 intermeshed and thereby locks the floating section 42 to the capstan section 35.

Loosening, or backing off, the nut 48 permits the floating section 42 to be displaced axially away from the capstan section 35 so that the teeth 43 and 44 may disengage. This allows the two drum sections 35 and 42 to be rotated relative to each other for adjusting the tension on the cable strands 14A and 14B. The radially outer edge of the flange 51 on the floating section 42 may be smoothly serrated, as at 52, to provide a hand grip for turning the floating section. Or, if greater tension is required for particular installation, the hub 53 of the floating section may be provided with a head such as the hexagonal end depicted (FIG. 4) so that a wrench may be applied for tensioning strand 14A.

To tension strand 14B, the capstan section 35 and the shaft 12 on which it is affixed must be rotated relative to the floating section 42. In many installations this can be easily accomplished. However, in some installations it is inconvenient to rotate the shaft 12 for tensioning strand 14B and not desirable to change the relative position of the shafts 12 and 13. The embodiment depicted in FIG. 6 is particularly adapted for such installations.

Figure 6:
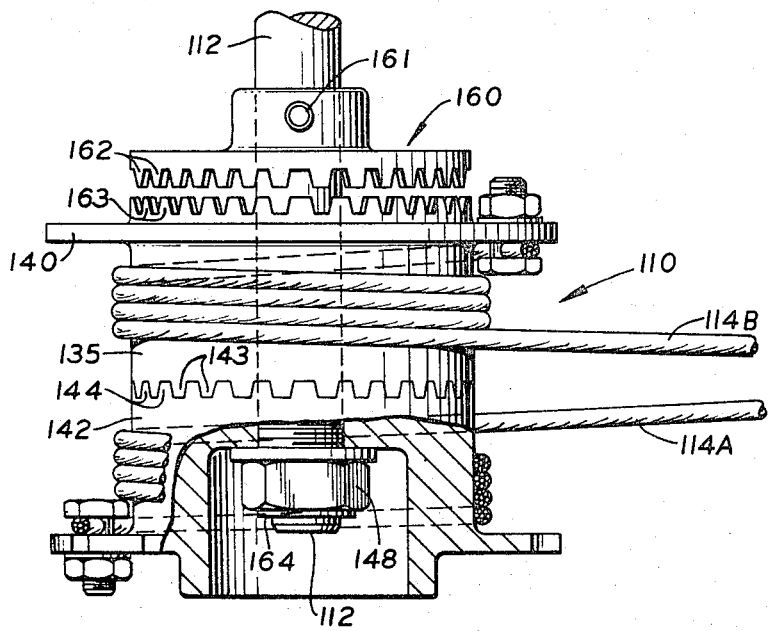
FIG. 6 is a top plan of an alternative form of drum means for adjusting the tension in the cables of a balanced remote transfer system.

The adjusting drum 110 depicted in FIG. 6 is also transversely divided into a capstan section 135 and a floating section 142 and is otherwise identical to the construction depicted in FIGS. 3–5, inclusive, except for the manner in which it is mounted on the shaft 112. The capstan section 135 is not directly connected to the shaft 112 but is also selectively rotatable with respect thereto. A radially extending anchor plate 160 is nonrotatably affixed to the shaft 112 as by a key, splines, or the set screw 161 depicted. A plurality of teeth 162 extend axially of the anchor plate 160 toward the capstan section 135 and are selectively engageable with a plurality of opposedly directed mating teeth 163 on the flange 140 on the capstan section 135.

By utilizing an anchor plate 160 the capstan section 135 can be readily rotated with respect to the shaft 112 for tensioning the strand 114B, and the floating section 142 can be rotated relative to the capstan section 135 for tensioning strand 114A. As is apparent from FIG. 6, a lock ring 164 in the shape of a C-clip may be received in a groove on the end of the shaft 112 to limit the distance that the clamping, or locking, nut 148 may be backed off. As shown, the nut 148 is permitted to move axially only an amount necessary to disengage either the teeth 162 and 163 or the teeth 143 and 144, i.e., a distance substantially less than the combined axial meshing dimension of the two sets of teeth. Such an amount has been found to be most convenient as it permits disengagement of teeth 162 and 163 for adjustment of the strand 114B by turning the drum 110 as a unit, and then engaging teeth 162 and 163 to hold the tension applied to strand 114B while disengaging teeth 143 and 144 to tension strand 114A by turning the floating section 142 alone. With both strands 114A and 114B tensioned to the desired degree the nut 148 is tightened to lock the teeth 162 and 163 and the teeth 143 and 144 in meshing engagement.

If desired, a similar locking ring 64 may also be used with the embodiment depicted in FIGS. 3–5, as shown.

Furthermore, with the embodiment depicted in FIG. 6, the drum 110 may be disconnected from the shaft 112 as a unit for rotation of the shaft alone, as when indexing a guide such as used to indicate dead ahead on the steering wheel.

Where the particular disposition of the guide pulleys, or the number of turns required of the drum, is such that there is a tendency of the strands to overwrap, it has been found that this tendency can be effectively precluded by the provision of helical grooves over a portion of the drum.

As shown in FIG. 7, an alternative form of adjusting drum, indicated generally by the numeral 210, is also divided into a capstan section 235 and a floating section 242. However, a cable receiving, helical groove 270 is provided on the capstan section 235 of the drum 210 and a similar groove 271 is provided in the floating section 242. The groove 270 in the capstan section 235 extends, threadlike, from the flange 240 approximately half way toward the floating section 242 where the groove 270 gradually fades, or merges, into the smooth cylindrical outer surface 272 of the capstan section 235. The strand 214B wrapped onto the capstan section is received within the groove 270 and the end of the strand 214B extends through the bore 238 in bolt 239 by which that strand of the cable is firmly anchored to the flange 240.

Similarly, a groove 271 extends, threadlike from the flange 251 along the floating section 242 approximately half way toward the capstan section 235 where this groove too gradually fades, or merges, into the smooth cylindrical outer surface 273 of the floating section 242. The strand 214A wrapped onto the floating section 242 is received within the groove 271 with the end thereof extending through a bore 274 in bolt 275 by which the cable strand 241A is firmly anchored to the flange 251.

Most marine steering systems can be satisfactorily operated with the adjusting drum 210 being rotatable through a range of four to six revolutions. It is also most advantageous to provide sufficient cable for at least two additional revolutions of the drum at each end of its normal range as a safety factor. Therefore, to provide six turns of cable throughout the operating range with a two turn factor of safety at each end, the capstan and floating sections, 235 and 242, respectively, would each have five turns of the cable wrapped thereabout when the adjusting drum 210 is at the mid point of its normal rotational range, as shown in FIG. 7.

By supplying each section of the adjusting drum with a grooved portion, the three operating turns of cable on each section plus the two safety turns maintain themselves arranged well to the side of the intermeshed teeth 243 and 244, which define the transverse split that divides the drum 210 into the floating and capstan sections, so that ease of adjustment is assured. Moreover, when the drum is turned to its normal full extent in either direction the cable does not chafe unnecessarily against adjacent turns. As shown in FIG. 8, when the drum 210 is turned through its normal full range in one direction, an additional three full turns of the strand 214B are wound onto the drum 210. Because of the provision of grooves 270 and 271, the additional length of that strand will wrap onto and across the medial portion of the drum without undue abrasion of the additional turns, one against the other. And, this construction precludes the additional length of strand 214B being wrapped onto the drum 210 from being forced against or, even worse, onto the corresponding length of strand 214A being unwrapped as the drum 210 rotates.

Additionally, when the drum 210 is counterrotated from the position shown in FIG. 8 to the position shown in FIG. 7, the strand 214A will not lay onto the drum in the expanded helix defined by the annular orientation of the cable 214A from the guide pulley 278 to the contact point of the cable 214A with the floating section 242 of the drum 210. Rather, the cable strand 214A will be forced, by the groove 271, to wrap adjacent the preceding turn, and the cable will continue so to wrap throughout the extent of the groove 271.

With the groove extending over at least half the surface of the floating section 242, by the time the groove merges with the cylindrical surface 273 of the floating section the angular orientation of the strand 214A is so slight that the strand will wrap onto the drum in an orderly fashion without the necessity of the groove. It should be noted that the grooves 270 and 271 must not extend fully across the surface of the capstan and floating sections, as a fully grooved drum 210 would prevent the selective positioning of the capstan and floating sections with respect to each other necessary to permit adjustment in the cable tension provided by the subject concept.

Whether the capstan section 235 of this alternative drum 210 is secured to the driving shaft 212 by the set screw 236 or whether an anchor plate construction of the type disclosed in FIG. 6 is employed will depend upon the demands of the particular installation.

Figure 9:
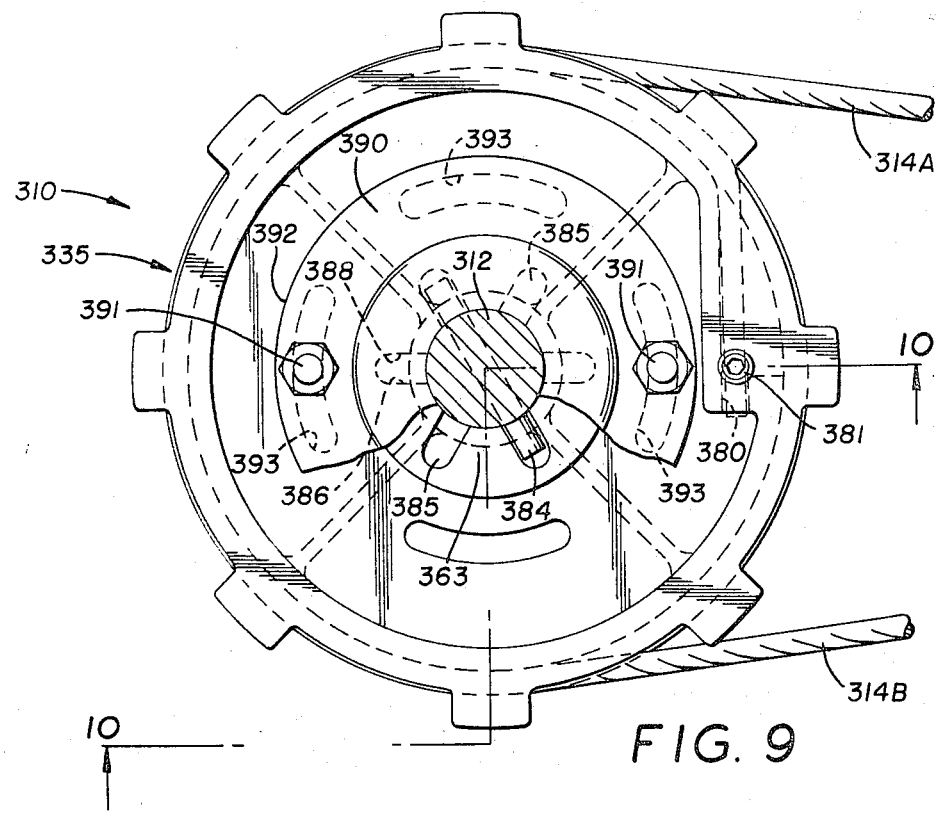
FIG. 9 is a side elevation of a further alternative form of adjusting drum means.
Figure 10:
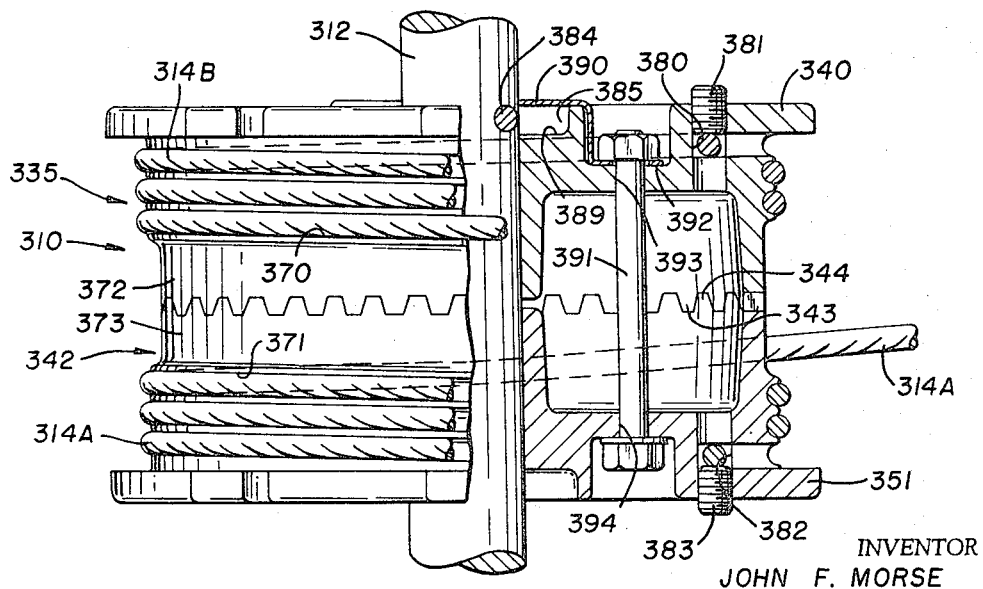
FIG. 10 is a cross section taken substantially on the line 10—10 of FIG. 9.

Alternatively, the drum may be secured to the driving shaft by an anchor means of the type disclosed in FIGS. 9 and 10. The drum 310, shown in FIGS. 9 and 10, is also divided into a capstan section 335 and a floating section 342. A cable receiving groove 370 is preferably provided on the capstan section 335 of the drum 310, and a similar groove 371 is provided on the floating section 342.

The groove 370 in the capstan section 335 extends, threadlike, from an anchor bore 380 adjacent the flange 340 approximately half way toward the floating section 342 where the groove 370 gradually fades, or merges, into the smooth cylindrical outer surface 372 of the capstan section 335. The strand 314B wrapped onto the capstan section 335 is received within the groove 370, and the end of the strand 314B extends into the anchor bore 380 where it is retained by a set screw 381.

Similarly, a groove 371 extends, threadlike, from an anchor bore 382 adjacent the flange 351 along the floating section 342 approximately half way toward the capstan section 335 where this groove too gradually fades, or merges, into the smooth cylindrical center surface 373 of the floating section 342. The strand 314A wrapped onto the floating section 342 is received within groove 371, and the end of the strand 314A extends into the anchor bore 382 where it is retained by a set screw 383.

This construction also permits the capstan section 335 to be selectively rotatable with respect to the driving shaft 312. A radially extending anchor pin 384 is non-rotatably affixed to the shaft 312. A plurality of teeth 363 on the capstan section 335 present axially oriented valleys 385 therebetween into which the anchor pin 384 is selectively engageable.

The pin 384 keys against the generally radial side walls 386 and 388 of each valley 385 for a rotational driving connection between the shaft 312 and the capstan section 335. The pin 384 also abuts the transverse backwall 389 of each valley 385 as an axial positioner, or stop, for the capstan section 335.

A securing cap plate 390 is positioned transversely of the shaft 312 in axially spaced relation to the backwall 389 and abuts the side of the pin 384 opposite backwall 389. A plurality of tightening means in the form of bolts 391 extend between the capstan and floating sections of the drum 310 selectively to maintain the teeth 343 on the capstan section 335 intermeshed with the teeth 344 on the floating section 342. The bolts 391 also extend through the peripheral flange 392 on the cap plate 390 selectively to position the plate 390 for securing the pin 384 within valleys 385.

As best shown in FIG. 10, the bolts 391 are received through arcuately elongated slots 393 and 394 in the capstan and floating sections of the drum 310, respectively, to accommodate selective rotation of the floating section 342 with respect to the capstan section 335.

By utilizing the construction shown for drum 310 not only can the capstan section 335 be readily rotated with respect to the shaft 312 for tensioning the strand 314B, but the floating section 342 can also be rotated relative to the capstan section 335 for tensioning strand 314A.

It should therefore be readily apparent that an adjusting drum embodying the concept of the present invention provides an inexpensive means for individually adjusting the tension in the control cables of a balanced remote transfer system and also permits multiple revolutions of the driving and driven components. This and the other objects of the invention have thus been accomplished.

I claim:

1. In a systeem for transferring motion between a driving and a driven shaft by balanced first and second cable strands, at least one adjusting drum means, said drum means comprising, an anchor plate affixed radially to one of said shafts, teeth means on said anchor plate, a capstan section rotatably mounted on said shaft in proximity to said anchor plate, teeth means on said capstan section opposed to the teeth means on said anchor plate and selectively intermeshable therewith relative rotation between said anchor plate and said capstan being precluded when said teeth means are meshed, one of said balanced cables secured to said capstan section, a floating section rotatably mounted on said shaft in proximity to said capstan section, teeth means on said floating section selectively intermeshable with opposed teeth means on said capstan section, relative rotation between said floating and said capstan sections being precluded when the teeth means therebewteen are meshed, the second of said balanced cables secured to said floating section and clamping means for permitting selective meshing and unmeshing of the teeth means between the anchor plate and the capstan section as well as between the capstan and floating sections.

2. In a system for transferring motion between a driving and a driven shaft by balanced first and second cable strands, at least one adjusting drum means, said drum means comprising, a radially extending anchor plate affixed to one of said shaft, a capstan section rotatably mounted on said shaft, a plurality of teeth extending axially from said anchor plate toward said capstan section selectively intermeshing with a plurality of opposedly directed teeth on said capstan section, a floating section rotatably mounted on said shaft adjacent said capstan section, a second plurality of teeth on said capstan section, said second plurality of teeth extending axially from said capstan section selectively intermeshing with a plurality of opposedly directed teeth on said floating section, one of said balanced cables secured to said capstan section, the second of said balanced cables secured to said floating section and clamping means for permitting selective engagement and disengagement of said teeth.

3. A transfer system, as set forth in claim 2, in which said clamping means comprises a nut threadably received on said shaft and movable axially toward and away from said floating section, a retaining clip mounted on said shaft axially outwardly of said nut a distance substantially less than the combined axial meshing dimension of the set of teeth between said capstan section and said anchor plate and the set of teeth between said capstan section and said floating section so that either set may be selectively disengaged with the other set engaged when said nut is moved away from said floating section and against said retaining clip, and both sets are lockingly engaged when said nut is moved toward said floating section.

4. In a system for transferring motion between a driving and a driven station, an adjusting drum, at least one of said stations providing a shaft mounted for rotation, said adjusting drum comprising, a capstan section, means for securing said capstan section nonrotatably to said shaft, a floating section, said floating section rotatably mounted on said shaft adjacent said capstan section, the first of said balanced cables secured to said capstan section remotely of said floating section, the second of said balanced cables secured to said floating section remotely of said capstan section, a threadlike, helical groove extending over approximately that half of said capstan section remote from said floating section, the first said balanced cable receivable in said groove, a threadlike, helical groove extending over approximately that half of said floating section remote from said capstan section, the second said balanced cable receivable within the groove in said floating section and locking means selectively to secure the floating section to said capstan section.

5. An adjusting drum, as set forth in claim 4, in which the helical grooves on the capstan and floating sections merge into a smooth cylindrical surface that extends from said groove to the opposite of said sections and forms the medial portion of said adjusting drum.

6. An adjusting drum, as set forth in claim 5, in which the locking means between said capstan and floating sections comprises a plurality of teeth on said capstan section extending axially toward said floating section and a plurality of opposedly extending similar teeth selectively engageable therewith on said floating section, and securing means for permitting selective engagement and disengagement of said teeth.

7. An adjusting drum, as set forth in claim 6, in which the means securing said capstan section to said shaft comprises a radially extending anchor means affixed to said shaft, teeth means on said capstan section selectively intermeshable with said anchor means.

8. An adjusting drum, as set forth in claim 7, in which the anchor means comprises, a radially extending anchor plate, a plurality of teeth extending axially of said anchor plate toward said capstan section and selectively intermeshable with the opposingly directed teeth on said capstan section.

9. In a system for transferring motion between a driving and a driven shaft by balanced first and second cable strands, at least one adjusting drum means, said drum means comprising, a capstan section rotatably mounted on one of said shafts, one of said balanced cables secured to said capstan section, an anchor means for selectively securing said capstan section in a relative rotational position with respect to the shaft on which it is mounted, a floating section rotatably mounted on said shaft in proximity to said capstan section, the second of said balanced cables secured to said floating section, teeth means on said floating section selectively intermeshable with opposed teeth means on said capstan section, relative rotation between said floating and capstan sections being precluded when the teeth means therebetween are meshed, and securing means for permitting selective meshing and unmeshing of the teeth means between said capstan and floating sections.

10. An adjusting drum means, as set forth in claim 9, in which a first, threadlike, helical groove extends over approximately that half of said capstan section remote from said floating section, the balanced cable secured to said capstan section receivable in said first groove, a second, threadlike, helical groove extends over approximately that half of said floating section remote from said capstan section, the balanced cable secured to said floating section receivable in said second groove.

11. A transfer system, as set forth in claim 9, in which the anchor means for securing said capstan section to said shaft comprises a pin means secured radially of the shaft on which said capstan section is mounted, second teeth means on said capstan section selectively intermeshable with said pin means, relative rotation between said capstan section and the shaft to which said pin means is secured being precluded when said second teeth means and said pin means are meshed.

12. An adjusting drum means, as set forth in claim 11, in which a first, threadlike, helical groove extends over approximately that half of said capstan section remote from said floating section, a second, threadlike, helical groove extends over approximately that half of said floating section remote from said capstan section, the said helical grooves on said capstan and floating sections merging into a relatively smooth cylindrical surface that extends from each said groove to the opposite of said sections and forms the medial portion of said adjusting drum, the balanced cable secured to said capstan section receivable in the groove therein and onto the medial portion of said adjusting drum, the cable secured to said floating section receivable in the groove therein and onto the medial portion of said adjusting drum.

References Cited

UNITED STATES PATENTS

| 26,652 | 1/1866 | Colvin | 114—160 |
| 197,310 | 11/1877 | Baldwin et al. | 254—150 |
| 873,048 | 12/1907 | Hurlburt | 114—160 |
| 905,871 | 12/1908 | Hall | 114—160 |
| 1,080,766 | 12/1913 | Lund et al. | 114—160 |

FOREIGN PATENTS

| 1,227,933 | 3/1960 | France. |
| 1,186,187 | 1/1965 | Germany. |

FRED C. MATTERN, JR., *Primary Examiner.*

C. F. GREEN, *Assistant Examiner.*